United States Patent [19]

Davis et al.

[11] Patent Number: 5,046,551
[45] Date of Patent: Sep. 10, 1991

[54] LONG TERM THERMAL ENERGY PRODUCTION, STORAGE AND RECLAIM SYSTEM

[75] Inventors: Thomas L. Davis; Robert N. Elliott, III, both of Raleigh; Joseph A. Gregory, Angier, all of N.C.

[73] Assignees: Carolina Power & Light Company, Raleigh; North Carolina Alternative Energy Corporation, Research Triangle Park, both of N.C.

[21] Appl. No.: 543,169

[22] Filed: Jun. 25, 1990

[51] Int. Cl.[5] .............................................. F28F 7/00
[52] U.S. Cl. ....................................... 165/45; 62/260
[58] Field of Search ....................... 62/79, 238.6, 260; 165/45

[56] References Cited

U.S. PATENT DOCUMENTS

| 3,262,493 | 7/1966 | Hervey | 165/45 X |
| 3,339,629 | 9/1967 | Hervey | 165/45 |
| 4,237,859 | 12/1980 | Goettl | 165/45 X |
| 4,653,287 | 3/1987 | Martin, Jr. | 62/238.6 X |

OTHER PUBLICATIONS

"Assessment of the Load Management Potential of the Annual Cycle Energy System", Oak Ridge National Laboratory (Jun. 1988), pp. 4-8.

*Primary Examiner*—Lloyd L. King
*Attorney, Agent, or Firm*—Richard S. Faust

[57] ABSTRACT

Disclosed is a long term thermal energy production, storage and reclaim system that benefits the electric utility and its customers by shifting electricity usage from a spiked, high power, direct acting basis operated largely during seasonal peak demand periods to a long term level load at a significantly lower power level. The electricity usage shift is achieved by long term storage of thermal energy generated by a continuously operated low power level prime mover and the use of the stored energy on demand to satisfy the seasonal thermal load. The initial cost of the long term thermal energy production, storage and reclaim system is cost competitive with that of direct acting systems for satisfying the same loads. By using the system, the customer saves significantly on energy charges during the life of the system due to a rate structure that provides favorable rates for customers who do not adversely impact the utility's annual load factor.

18 Claims, 7 Drawing Sheets

LONG TERM THERMAL ENERGY PRODUCTION, STORAGE AND RECLAIM SYSTEM

FIELD OF THE INVENTION

The invention relates to the shifting of energy usage from periods of high demand to periods of lower demand. More particularly, the invention relates to the shifting of electricity usage from a spiked, high power, direct acting basis operated largely during seasonal peak demand periods to a long term level load at a lower power level. The electricity usage shift is achieved by long term storage of thermal energy generated by a continuously operated low power level prime mover and the use of the stored energy on demand to satisfy the seasonal thermal loads.

BACKGROUND OF THE INVENTION

For many years, electric utilities have experienced a deteriorating load factor due to short term seasonal heating and cooling loads that are coincident with winter and summer weather extremes, which usually coincide with the electric utility's electric demand peak. One effort at addressing this problem has been the use of diurnal energy storage which shifts electric demand from daily peak to the daily off-peak period, thereby shifting the electric load from a peaking unit to a base low unit. This is beneficial to the utility, but it does not do anything to alter the utility's annual load factor. Examples of diurnal energy shifting systems which incorporate thermal storage capabilities are disclosed in U.S. Pat. Nos. 3,262,493; 3,339,629 and 4,237,859.

A more recent concept is the so-called ACES system for load shifting which is described in a publication entitled "Assessment of the Load Management Potential of the Annual Cycle Energy System" prepared by Oak Ridge National Laboratory, Oak Ridge, Tenn. (1984). According to the ACES system, in a residential setting a vapor compression prime mover is used to heat the home on demand during the heating season using rejected heat from the production of ice. The ice is stored and then used during the cooling season to cool the home. While the ACES system provides a electric usage shift more significant than diurnal storage, it is not a solution suitable for many applications.

An area in which energy shifts can produce remarkable results for electric utilities is in the area of agricultural heating and cooling requirements which are normally of short duration, and largely coincident with weather extremes, which usually results in a coincidence with the electric utility's demand peak. For example, in the farming of fresh produce it has been found that postharvest produce cooling extends shelf life, slows quality deterioration and improves profitability. Top quality may be produced in the farmer's field, but the prime vine ripened produce will not bring top dollar during the summer harvest season unless the produce has been cooled to the proper holding temperature as soon as possible. Unfortunately, from the electric utility's standpoint, the demand for this type of postharvest produce cooling coincides with the utility's summer peak load period.

Thus, from the standpoint of the electric utility it would be advantageous to have a long term thermal energy storage system that would assist in shifting seasonal peak load usage to a lower cost option for the utility. However, it is also necessary that the initial start-up cost of such a system, and the long range operating cost, provide an adequate incentive for the end user to install and use the system.

SUMMARY OF THE INVENTION

In accordance with the present invention there is provided a long term thermal energy production, storage and reclaim system for shifting energy usage from a spiked, high power, direct acting basis operated largely during peak demand periods to a long term level load at a lower power level. The system comprises a low power electrical prime mover which is less than the size of the prime mover that would be required to satisfy a series of disconnected thermal seasonal loads by a direct acting mode of operation. Thermal energy generated by the low power prime mover is stored in a thermal energy storage tank. A heat transfer system associated with the storage tank transfers thermal energy on demand from the tank to satisfy the series of disconnected thermal loads. The size and thermal insulating properties of the storage tank and the size of the prime mover are so selected as to provide sufficient thermal energy output and storage throughout the long term period of operation of the prime mover to supply thermal energy to the loads without discharging the thermal energy contained in the storage tank below a predetermined level and without charging the thermal energy in the storage tank above a predetermined level. Thus, the operation of the prime mover is totally decoupled from the energy demand of the thermal loads.

In a particular embodiment, the prime mover may take the form of a ice machine and the storage tank may take the form of a thermally insulating tank adapted to hold an agglomerated ice mass therein. In other embodiments a hot storage tank is associated with the cold storage tank for capturing rejected heat from the ice making operation and storing the same for use during periods in which heating is required. The use of any substantial part of the rejected heat represents a significant energy savings since this energy is ordinarily discharged to the air.

In another aspect the present invention comprises a method of shifting electrical energy usage from an electric utility's peak load times to a long term level load that is spread over a period measured in months. According to this method, a series of disconnected short duration seasonal cooling loads is disconnected from the primary energy supply stream. The method is carried out by operating an ice machine on a substantially continuous basis over a long term period measured in months and generating a sufficient quantity of ice to supply the total cooling requirements for the series of cooling loads plus an amount of ice to accommodate thermal energy losses. The prime mover is operated at a charging/discharging time ratio greater than about 5, with a ratio of 10 or even 15–30 being preferred. The ice is stored as generated in an ice/water mixture in a thermal energy storage tank. The thermal energy stored in the storage tank is transferred on demand to satisfy the thermal loads. Thus, the electricity usage for powering the prime mover is decoupled from the energy demands of the series of disconnected short duration cooling loads to shift electricity usage from a spiked, high power, direct acting basis occurring largely during peak demand periods to a long term level load at a low power level.

In certain preferred applications of the method the series of disconnected loads are seasonal loads that predictably occur each year and the prime mover operates for a period of approximately one year.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

The present invention will be described primarily in conjunction with certain applications in an agribusiness environment. However, it will be understood that the fundamental principles of the invention are applicable for other end uses.

THERMAL PRODUCTION, STORAGE AND RECLAIM SYSTEM COMPONENTS

Figure 1:
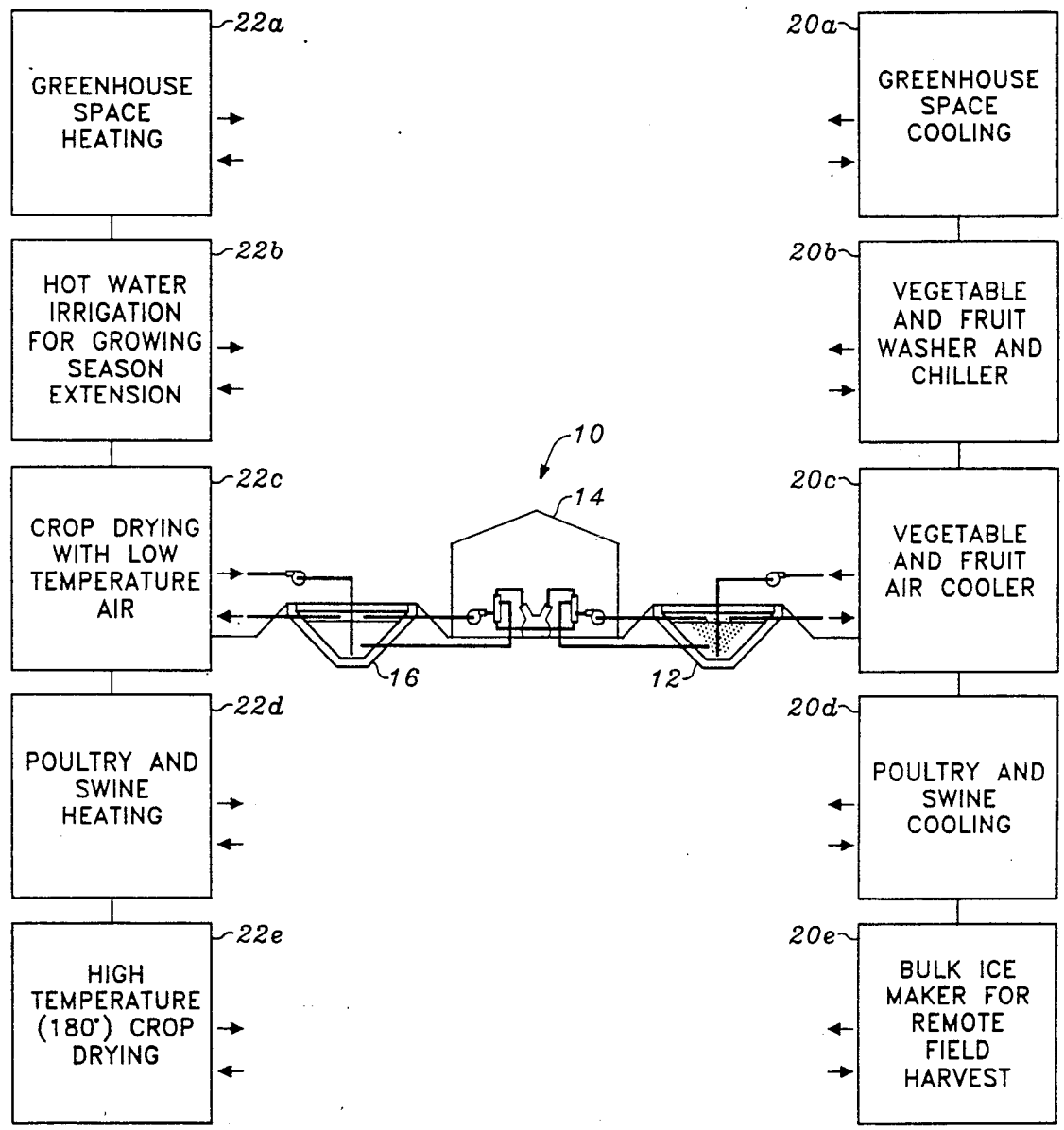
FIG. 1 is a schematic representation of the principal compounds of a long term thermal energy production, storage and reclaim system of the present invention.

FIG. 1 schematically shows a representative system 10 of the present invention and several potential cooling and heating loads occurring in an agribusiness environment. System 10 includes a low power prime mover which takes the form of an ice machine 14, a cold storage tank 12, a hot storage tank 16, a plurality of potential cooling loads 20a, 20b, 20c, 20d, 20e and a plurality of potential heating loads 22a, 22b, 22c, 22d, 22e. The ice machine 14 is a vapor compression refrigeration system that delivers ice to cold storage tank 12 and rejects heat to the heat transfer medium in hot storage tank 16. The details of a storage tank adapted for use with the present invention is disclosed in commonly assigned application Ser. No. 07/543,360, entitled "Thermal Storage Tank", filed on even date herewith and incorporated herein by reference.

AGRICULTURAL COOLING AND HEATING LOADS VERSUS AN ELECTRIC UTILITY'S LOAD PROFILE

Figure 3:
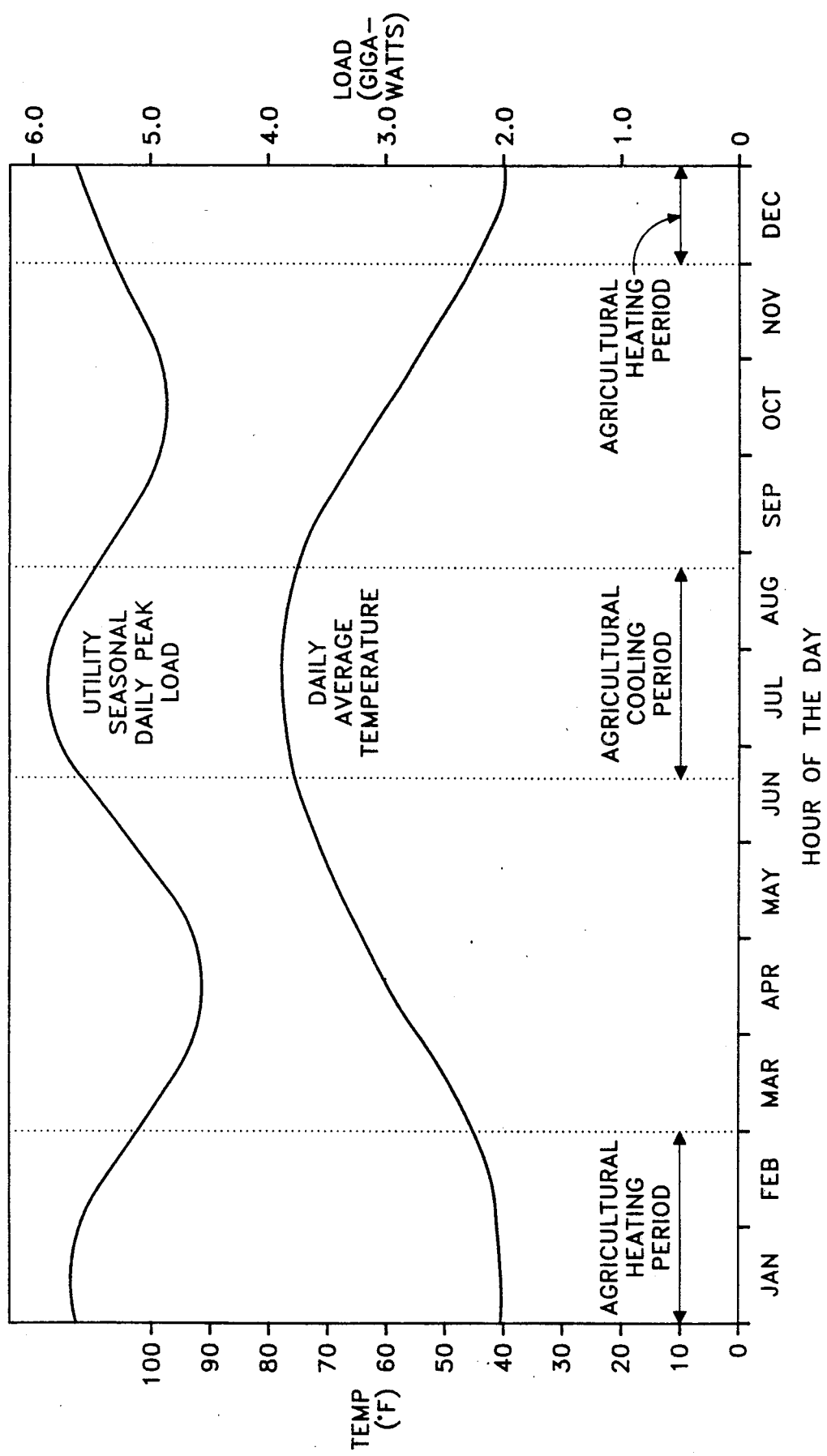
FIG. 3 is a graph illustrating generic agricultural heating and cooling periods and their relationship to an electric utility's seasonal daily peak load curve and a daily average temperature curve.

An shown in FIG. 3, agricultural requirements for both heating and cooling are coincident with weather extremes, which usually results in a coincidence with the utility's electric demand peak. For this reason it would be beneficial to the utility if these heating and cooling requirements can be decoupled from the primary electric energy supply.

Figure 2:
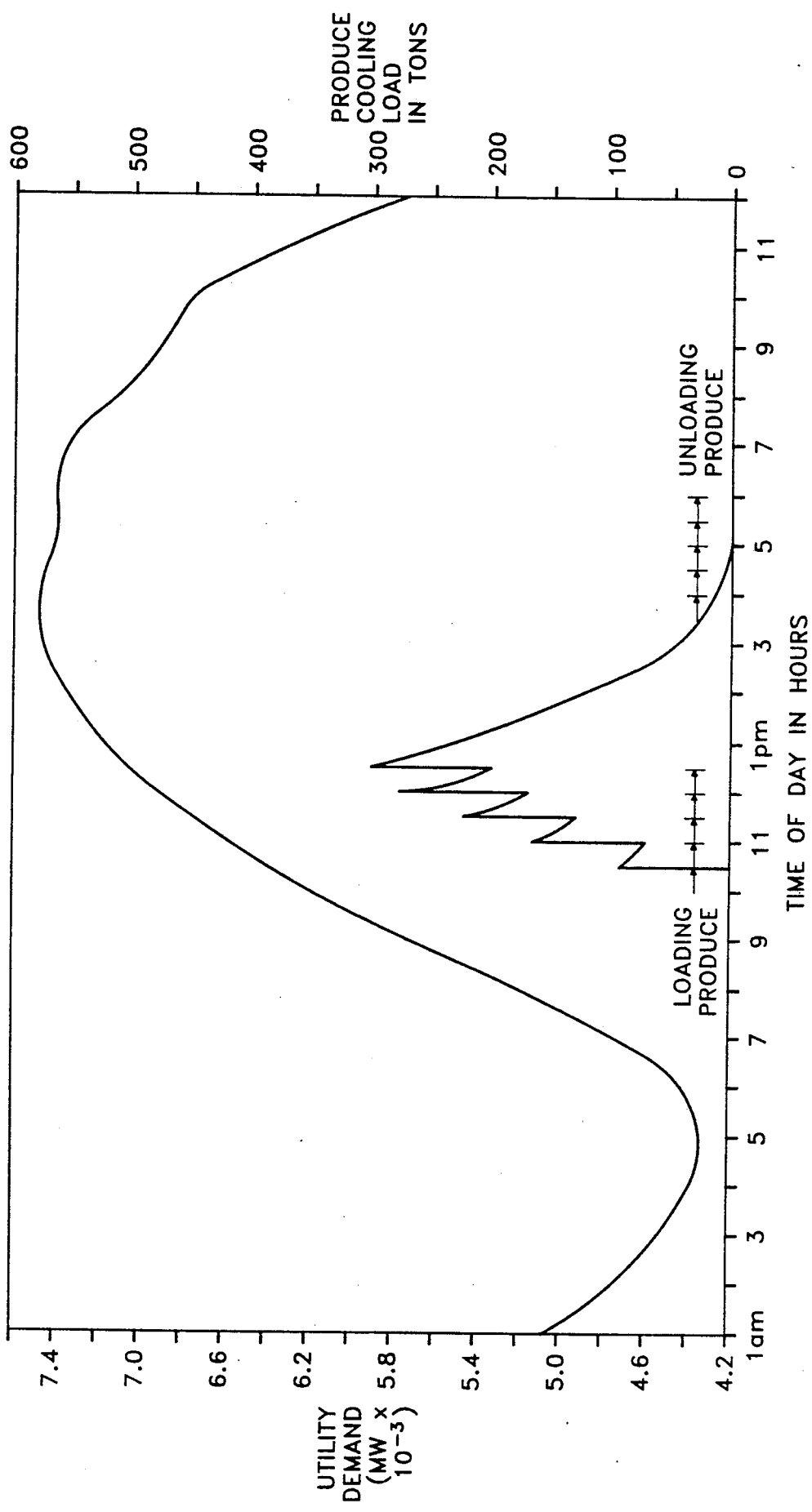
FIG. 2 is a graph illustrating the relationship during a 24 hour period between agricultural produce postharvest cooling requirements and an electric utility's summer day demand profile.

In the southeastern United States, the postharvest cooling requirements for local fresh produce may last for a period of approximately eight to 10 weeks starting in June. The daily load profile for such postharvest cooling typically will begin to ramp up at about 10:00 to 11:30 a.m., peak about noon and 1:30 p.m., and tail off over the following six to eight hours. Referring to the graph of FIG. 2, it can be seen that for the typical situation the daily cooling load profile unfortunately rises and falls with the daily electric utility demand profile. In addition, the eight to 10 week use per year presents the utility with a low load factor; therefore, direct acting produce precooling is not the kind of load the utility wants to add to the system, especially if the load becomes significant compared to the existing coincident load.

THE ANNUAL COOLING AND HEATING ENERGY REQUIREMENTS OF ONE REPRESENTATIVE AGRICULTURAL PRODUCE PROCESSING FACILITY

Figure 4:
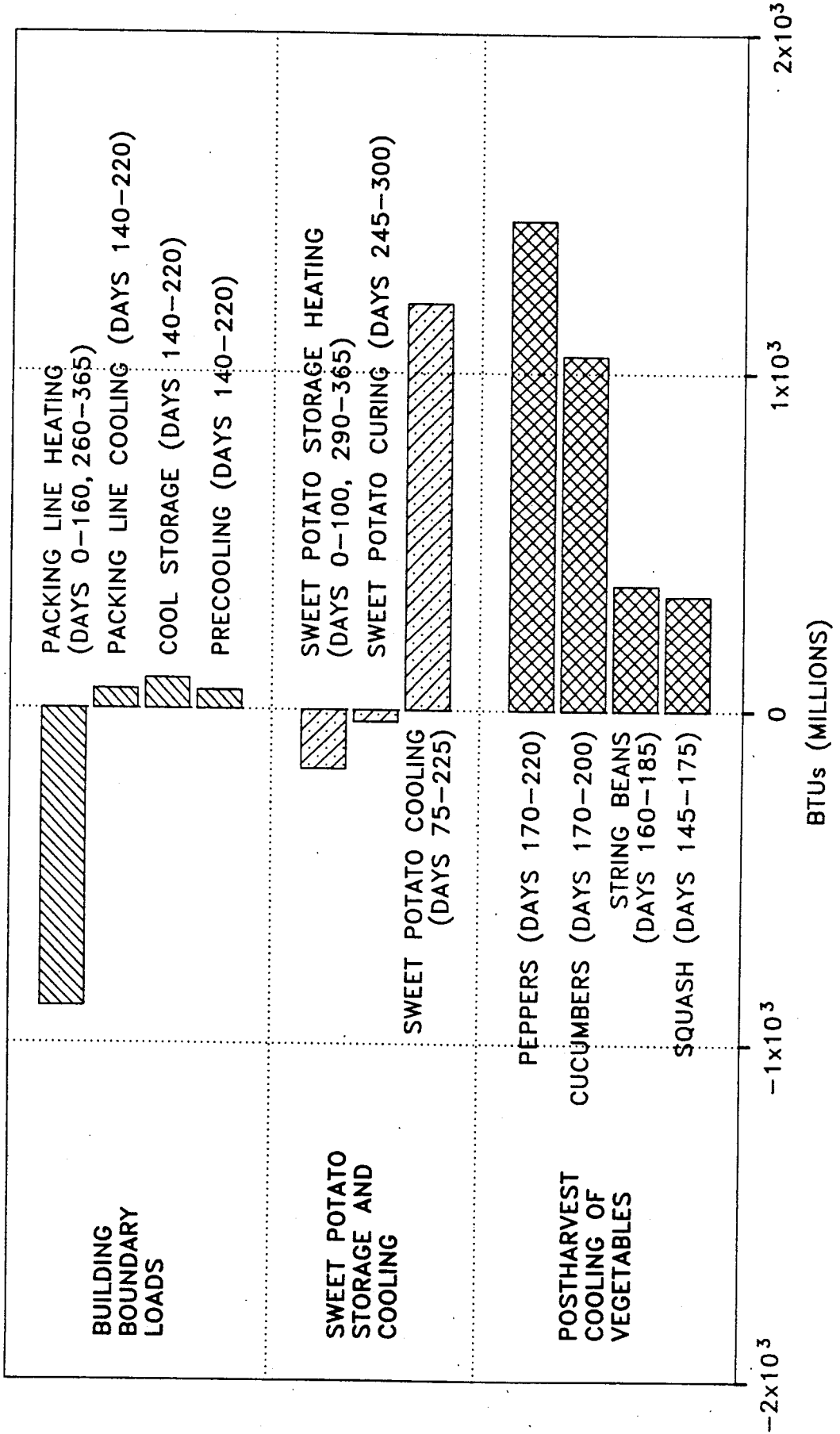
FIG. 4 shows the annual cooling and heating energy requirements for a representative agricultural produce processing facility.

FIG. 4 is a chart that shows the annual energy requirements for a produce processing facility located in the southeastern United States. The energy requirements are divided into three areas. First is the postharvest cooling of four vegetables: green peppers, cucumbers, string beans and squash. Second is sweet potato storage, curing and cooling. Finally, the chart of FIG. 4 provides data representative of the thermal losses at the building boundaries. For each cooling or heating energy requirement illustrated in FIG. 4 there is shown in parenthesis the days of the year during which this requirement must be met; for example, green pepper postharvest cooling occurs during days 170–220, or approximately mid-June to mid-August.

As can be seen from FIG. 4, the produce processing facility is used year-round. The fresh produce season runs from about days 145 to 225 (late April through August). After the fresh produce season ends, the postharvest cooling room is cleared and prepared for the curing of sweet potatoes from days 245 to 300 (September through October). An adjacent insulated building is used to store sweet potatoes over the winter; i.e., over days 0–100 and 290–265.

While the principles of the present invention may be applied to provide a long term thermal energy production, storage and reclaim system for providing all of the energy needs of the produce processing facility of FIG. 4, the specific examples set forth below relate to only certain of the cooling requirements.

COMPARISON OF DIRECT ACTING SYSTEM, DIURNAL STORAGE SYSTEMS AND LONG TERM STORAGE SYSTEMS AS UTILIZED IN POSTHARVEST PRODUCE COOLING

Figure 5:
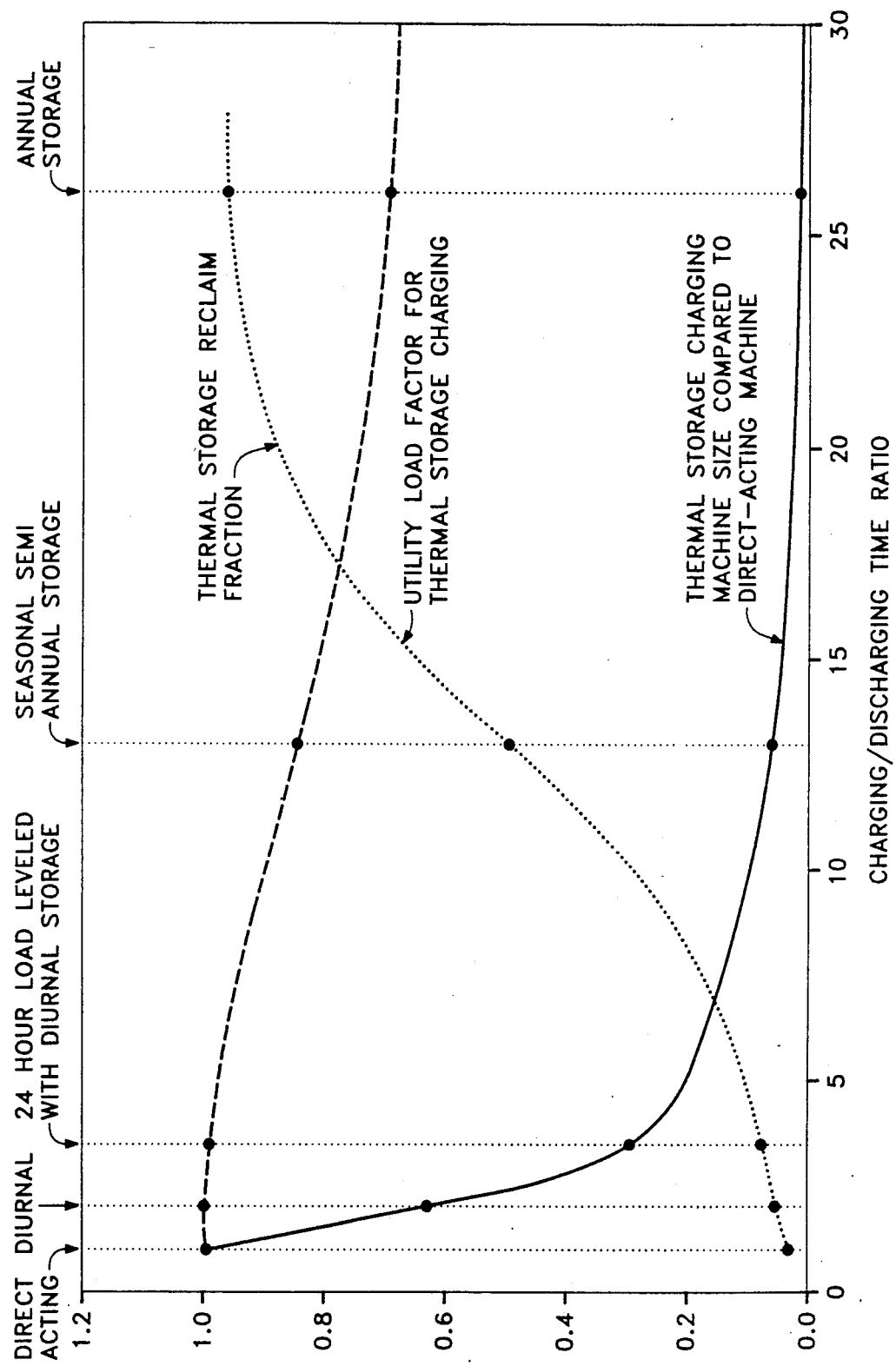
FIG. 5 is a graph that shows several relationships between the usage of (i) a direct acting system, (ii) an off-peak charging, on-peak discharging diurnal system, (iii) a 24 hour load levelled diurnal system, (iv) a seasonal semi annual storage system, and (v) an annual storage system, for providing the thermal energy for postharvest cooling of green peppers during an eight week period during the summer.

The graph of FIG. 5 illustrates the characteristics of several approaches for satisfying one defined cooling load for the produce processing facility discussed above in connection with FIG. 4. The sample load utilized for analysis is a postharvest green pepper cooling load that occurs from days 175-225 (approximately 8 weeks) at 5 days per week for a daily cooling requirement of $12.35 \times 10^6$ BTUs resulting in an eight week cooling energy requirement of $0.500 \times 10^9$ BTUs. This represents approximately ⅓ of the total green pepper cooling requirement at the above-described produce processing facility.

The graph of FIG. 5 considers five possible systems for satisfying the described cooling load: (i) a direct acting system, (ii) an off-peak charging, on-peak discharging diurnal system, (iii) a 24 hour load levelled diurnal system, (iv) a seasonal semi-annual storage system and (v) an annual storage system. The X axis in FIG. 5 represents the charging/discharging time ratio for each of the five systems. The charging/discharging time ratio is defined as the time the prime mover operates divided by the time the energy is supplied to the load. In all cases the discharging time or the time the energy is supplied to the load is eight weeks × five days/week × eight hours/day equals 320 hours.

In the case of a direct acting system the charging/discharging time ratio is, by definition, one. For the off-peak charging, on-peak discharging diurnal system which is assumed to charge for 16 hours per day and discharge for 8 hours per day the charging/discharging time ratio is 2.0. For the 24 hour load levelled diurnal system which charges 24 hours per day and discharges 8 hours per day the ratio is 3.0. The seasonal semi-annual storage system which operates from a point in the winter to the end of the 8 week load period is in the range from 10 to 15. Finally, the annual storage system as applied to this load produces a charging/discharging time ratio of approximately 27 (8600 hours/320 hours discharging).

The solid line of FIG. 5 represents a comparison of the size of the prime mover for each of the four thermal storage systems as compared to the size of the prime mover for a direct acting system required to satisfy the assumed load. The off-peak charging, on-peak discharging diurnal system is approximately 0.52 the size of the direct acting prime mover. For the 24 hour load levelled diurnal system the fraction is 0.35. For the seasonal semi-annual storage system, 0.08, and for the annual storage system, 0.02. While the cost of a smaller prime mover is not directly proportional to its smaller size, the cost savings associated with a significantly smaller prime mover for the semi annual or annual thermal storage systems provide adequate cost savings for the construction of the thermal storage tank and related equipment for the thermal storage system. In the example set forth above, the prime mover of the annual system is only two percent of the size of the prime mover of a direct acting system, while the cost of the smaller prime mover may be approximately four percent that of the direct acting prime mover.

The dashed line of FIG. 5 represents the thermal storage reclaim fraction for each of the five systems. Since the direct acting system does not store energy there are no thermal storage losses and the thermal storage reclaim fraction is one. For both diurnal systems the thermal storage reclaim factor is on the order of 0.98. For the seasonal semi-annual storage system the fraction is 0.90 and for the annual storage system, 0.70. Thus the semiannual and annual storage systems lose approximately 10% and 30%, respectively, of the stored energy due to thermal losses in storage.

The dotted line of FIG. 5 illustrates the utility capacity factor for each of the five systems; i.e., the percent of annual availability of the prime mover that is used to meet the load. For a direct acting system the utility capacity factor is on the order of 0.02. The diurnal systems provide a utility capacity factor on the order of 0.04 to 0.06. The semi-annual storage system runs approximately half of the year and therefore has a utility capacity factor of approximately 0.50. Finally, the annual storage system, allowing for a two week down time for maintenance, provides a 0.96 utility capacity factor.

EXAMPLE 1

Figure 6:
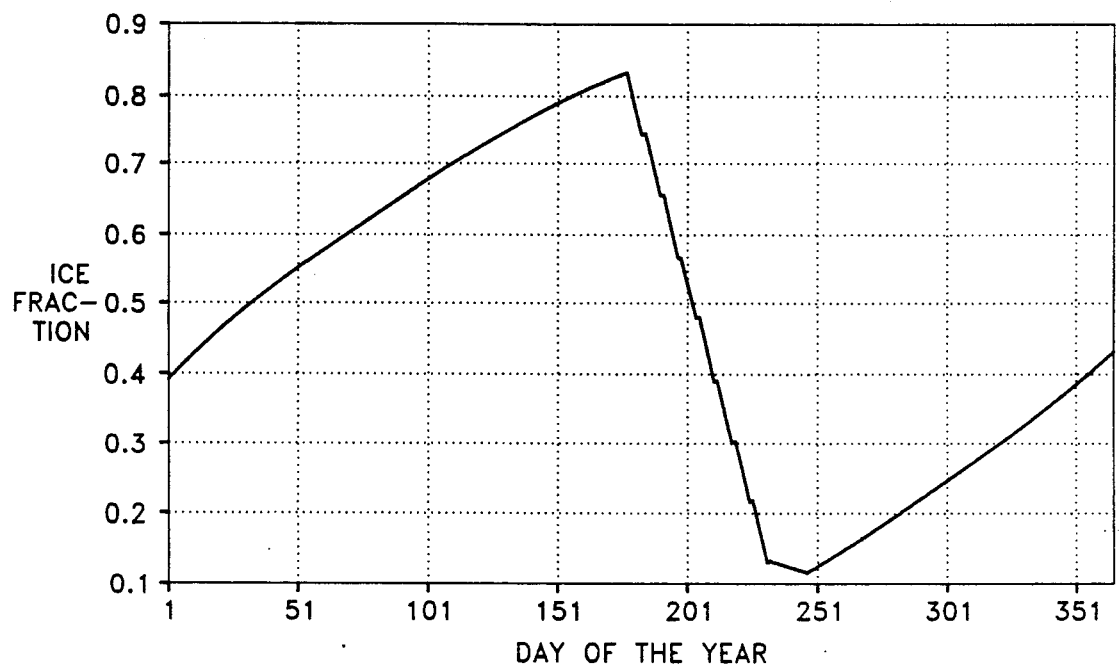
FIG. 6 is a graph showing on an annual basis the cold tank ice fraction versus time for an application of the invention that provides a portion of the postharvest cooling for the green pepper cooling load shown in FIG. 4.

A long term thermal production, storage and recall system similar to that depicted in FIG. 1 was utilized to provide the cooling energy requirements for the same eight-week green pepper postharvest cooling load that was the sample load around which the graph of FIG. 5 was generated. The system was sized utilizing a computer program that is generally discussed below. The system comprised a 10 ton ice machine which operated continuously for 50 weeks per year (down time at days 230-243) for maintenance. The ice from the machine was delivered to a cold storage tank in a manner described in commonly assigned application Ser. No. 07/543,360 entitled "Thermal Storage Tank" filed on even date herewith and incorporated herein by reference. The storage tank had a storage volume of 800,000 gallons and was charged with ice according to the graph of FIG. 6 which illustrates cold tank ice fraction versus time. Storage losses were approximately 30% of total ice generated. As shown in FIG. 6, at the onset of the postharvest green pepper cooling operation the tank had been charged to an ice fraction on the order of 83%. As approximately 1,800 tons of ice was melted over the 8 week period the ice fraction fell to approximately 13%, and fell again to approximately 11% during the two week down time for maintenance. The step effect in the curve during the 8 week cooling period represents the weekend shut down of the postharvest cooling operation which permitted partial recharging of the tank.

At 10 tons, the ice machine used for this annual thermal production, storage and reclaim system was only about two percent of the size of the 300 ton prime mover that would have been required to satisfy the eight week series of disconnected cooling loads for the green peppers. The substantial savings in the initial cost of the ice machine is generally sufficient to pay for the construction of the cold thermal storage tank and related system components, thus trading prime mover cost for storage tank construction cost. Thus the initial start-up cost for this annual storage system was cost competitive with that of a direct acting system. Moreover, beyond the initial cost considerations, there are two significant long term benefits of the system. First, while about 30% of the energy used to generate ice is lost in storage, the electricity used to generate the ice is much less costly to the customer because of more favorable rates, resulting in significant overall cost reductions for electrical power. Second, the heat rejected by the ice machine that is otherwise wasted to the atmosphere may be stored in a hot thermal storage tank as a recaptured energy bonus for satisfying a significant portion of the heating loads which are shown in the chart of FIG. 4. In this regard, the use of ice as the thermal energy storage medium in the cold tank makes use of the latent phase change of ice of 144 BTUs/lb. The use of water as the thermal storage medium in the hot storage tank does not share this advantage because at the temperatures commonly used hot water will not experience a phase change. Therefore, it may be advantageous to store only a portion of the rejected heat, while using the remaining rejected heat immediately or directing it to a cooling tower for dissipation. In view of the foregoing, for certain applications it may be desirable to use a phase change medium such as paraffin or an eutectic salt in conjunction with the hot storage tank in order to utilize the latent phase change energy.

Based upon typical commercial rates currently in use, the cost of the annual electricity charge for a direct acting system would be on the order of $16,000 versus $10,000 for the annual storage system of Example 1 --resulting in an annual energy cost savings of $6,000.

EXAMPLE 2

Figure 7:
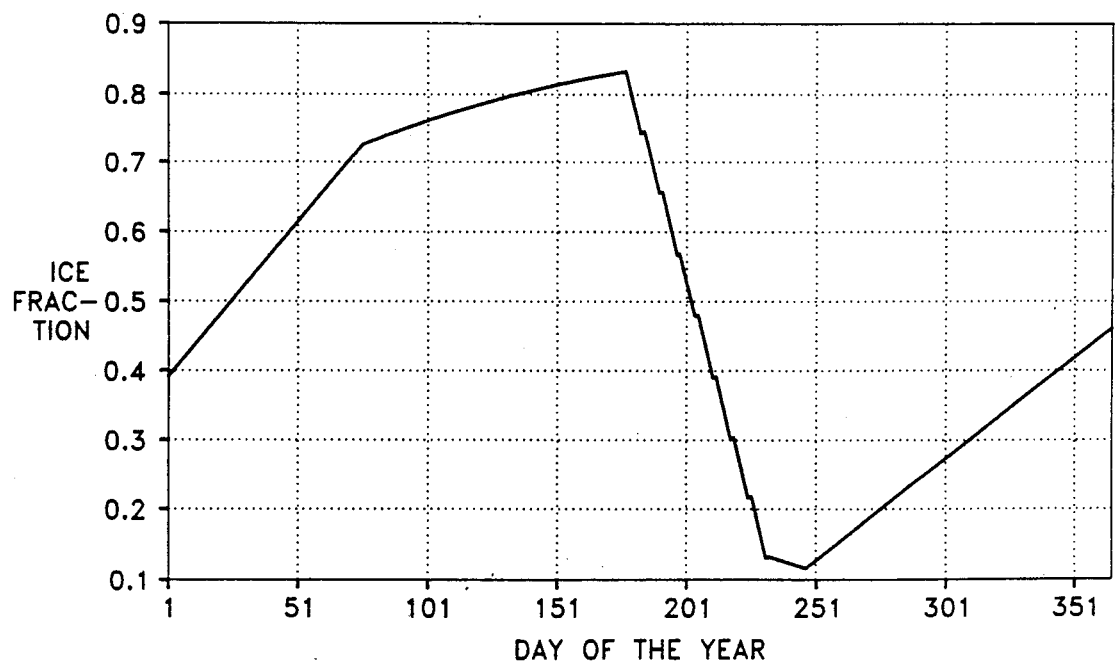
FIG. 7 is a graph similar to the graph of FIG. 6 but showing the cold tank ice fraction versus time wherein a larger prime mover is utilized to satisfy the same green pepper cooling load of FIG. 6 and an additional sweet potato cooling load.

FIG. 7 illustrates a plot of cold tank ice fraction versus time in the situation where the same postharvest green pepper cooling load is imposed upon the system from days 175-230 but with a second load for sweet potato cooling occurring at days 75-175. In order to accommodate this additional cooling load the ice machine capacity is increased; however, the cole tank capacity does not have to be increased.

EXAMPLE 3

Figure 8:
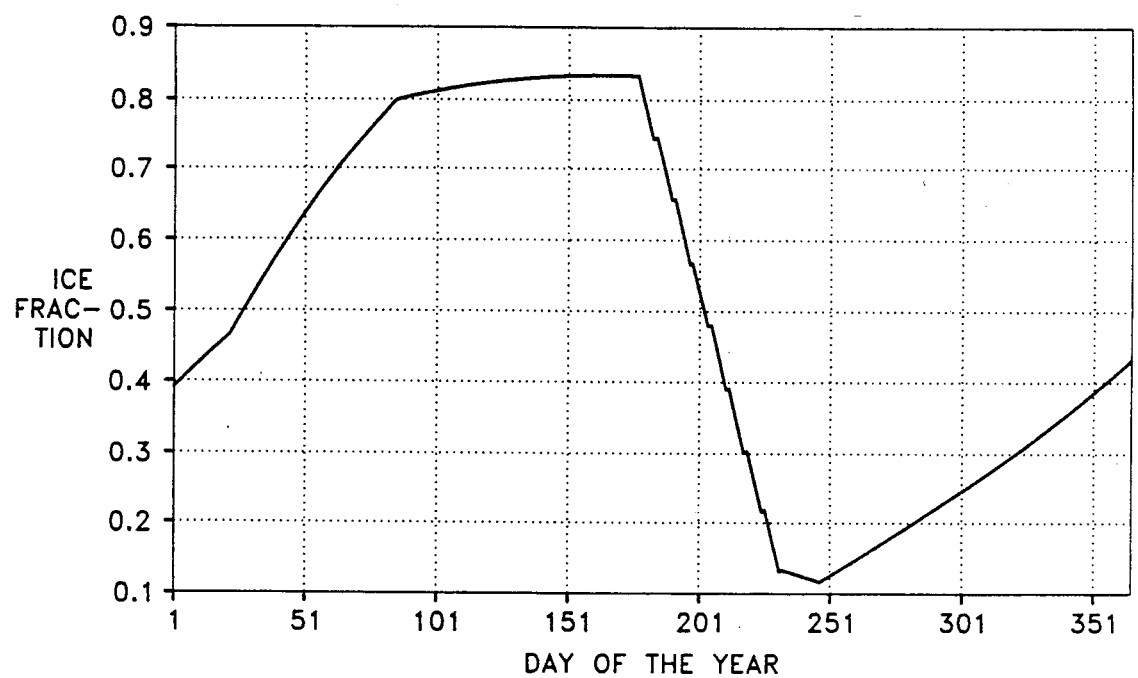
FIG. 8 is a graph similar to that of FIGS. 6 and 7 but showing the cold tank ice fraction versus time for satisfying the same green pepper and sweet potato cooling loads of FIG. 7 with a "piggy back" system.

FIG. 8 illustrates a plot of cold tank ice fraction versus time for another application of the invention which satisfies the same two postharvest cooling loads as in Example 2. However, in this example a so-called "piggy bank" system is utilized to enhance the ice production capability of the system from day 20 through day 175. Thus, the ice fraction curve is much steeper from days 20 to 75 reflecting the generation and storage of the ice output from two ice machines, the same 10 ton unit of Example 1 plus an additional piggy back unit. During the sweet potato cooling operation from day 75 to 175 the ice fraction increases at a very low rate to the 83% ice fraction necessary at day 175 to accommodate the green pepper cooling operation over the next 8 weeks.

SYSTEM SIZING

In order to design a system which operates under the principles of the present invention, it is necessary to determine the size of the prime mover (e.g. ice machine) and the size and insulation characteristics of the thermal storage tank(s). This may be accomplished by a computer program which analyzes the heat transfer across the boundary of the thermal storage mass to both external loads and the heat conducted across the boundary which causes thermal storage losses. The proposed computer analysis may have 365 steps (daily time increments) which means that the program calculates system interaction for one year. With input of the cooling and heating load profiles, the program sizes the prime mover and storage tanks. The design solution is iterative. Multiple runs of the program are made until all components match and the thermal storage inventory for Dec. 31 matches the input inventory initialized for Jan. 1 (see FIGS. 6-8).

SUMMARY OF SYSTEM PRINCIPLES AND ADVANTAGES

By way of summary, some of the more important system principles and advantages are as follows:

1. The system permits the electric utility in cooperation with its customers to shift electricity usage from a spiked, high power direct acting basis operated largely during seasonal peak demand periods to a long term level load at a low power level.

2. The system trades prime mover size/cost for thermal storage tank capacity/cost.

3. The system permits the utility to supply electrical energy at an optimal rate making maximum use of the utility's installed generation, transmission and distribution capacity.

4. The system permits the user to meet heating and cooling loads of any instantaneous magnitude within the design limits of the installed heat transfer equipment.

5. The system permits the user to add additional loads to the system at a fraction of the cost that the user would incur in meeting the additional loads through direct acting system(s); for example, meeting an unexpected level occasioned by extreme weather conditions.

6. The system permits the user to respond immediately to unexpected loads because the thermal energy is always readily available.

7. With on-site emergency power generators sized to deliver power for the energy reclaim equipment, the system permits the delivery of maximum cooling and heating during emergency conditions.

While the present invention has been described in connection with specific end uses and particular preferred embodiments, it will be appreciated that modifications may be made without departing from the true spirit and scope of the invention.

THAT WHICH WE CLAIM IS:

1. In the provision of the cooling or heating requirements to a series of disconnected thermal loads which occur over a cycle measured in weeks, a long-term thermal energy production, storage and reclaim system for shifting energy usage from a spiked, high power, direct acting basis operated largely during peak demand periods to a long-term level load at a low power level, said system comprising:

a low power prime mover for operating over a long term period measured in months, said prime mover being less than about 20 percent of the size of the prime mover that would be required to satisfy the series of disconnected thermal loads by a direct acting mode of operation;

at least one thermal energy storage tank;

means for supplying thermal energy from said low power prime mover to said storage tank;

heat transfer means associated with said storage tank for transferring thermal energy on demand from said tank to satisfy the series of disconnected thermal loads;

the size and thermal insulating properties of said storage tank and the size of said prime mover being so selected as to provide sufficient thermal energy output and storage throughout the long term period of operation of the prime mover to supply the thermal energy to the series of disconnected loads without discharging the thermal energy contained in the storage tank below a predetermined level and without charging the thermal energy in the storage tank above a predetermined level;

whereby the operation of the prime mover is decoupled from the power demands of the series of disconnected thermal loads to thereby shift energy usage from a spiked, high power, direct acting basis occurring largely during peak demand periods to a long term level load at a low power level resulting in a high utility capacity factor for the system.

2. The system of claim 1 including only one thermal storage tank, and wherein the series of disconnected loads occurs during either the summer peak demand period or the winter peak demand period.

3. The system of claim 2 wherein said prime mover is an ice machine, said storage tank is a thermally insulated storage tank for holding an ice/water mixture, and said means for supplying the thermal output of the prime mover to the storage tank comprises means for transferring ice from the ice machine to the thermally insulated storage tank.

4. The system of claim 3 wherein the ice fraction of the ice/water mixture in the storage tank varies in the range from about 0 percent to about 95 percent during the long term level load operating period of the prime mover.

5. The system of claim 1 including two thermal energy storage tanks, a first tank for storing the thermal chilling output from said prime mover and a second tank for storing the thermal heating output from said prime mover, and further including a heat transfer means associated with each tank, thereby defining a system capable of supplying thermal energy for a series of disconnected loads including both chilling loads and heating loads occurring during both the summer peak demand period and the winter peak demand period.

6. The system of claim 5 wherein said prime move is an ice machine.

7. A method of shifting electrical energy usage from an electric utility's peak load times to a long term level load that is spread over a period measured in months, said method comprising decoupling a series of disconnected short duration seasonal cooling loads from the primary energy supply stream by the following steps:

over a long term period measured in months, operating an ice machine on a substantially continuous basis and generating a sufficient quantity of ice to supply the cooling requirements for said series of disconnected cooling loads plus an amount of ice to accommodate thermal energy storage losses;

storing the ice as generated in an ice/water mixture in a thermal energy storage tank;

transferring the thermal energy in the tank to satisfy said loads on demand;

the steps of operating the ice machine over a long term period and transferring the stored thermal energy to satisfy the loads on demand defining a charging/discharging time ratio greater than about 5;

whereby the electricity usage for powering said ice machine is decoupled from the energy demands of the series of disconnected short duration cooling loads to thereby shift electricity usage from a spiked, high power, direct acting basis occurring largely during peak demand periods to a long term level load at a low power level.

8. The method of claim 7 wherein the series of disconnected loads are seasonal loads that predictably occur each year and said long term period measured in months is approximately one year.

9. The method of claim 8 wherein the ice machine is operated at a charging/discharging time ratio greater than about 10.

10. The method of claim 8 wherein the ice machines is operated at a charging/discharging time ratio in the range from 15 to 30.

11. The method of claim 8 including the steps of storing at least a portion of the heat rejected by said ice machine in a second thermal energy storage tank and transferring the thermal energy in said second tank to a series of disconnected short duration seasonal heating loads.

12. The method of claim 7 wherein said series of disconnected short duration cooling loads comprise postharvest crop cooling loads in an agribusiness environment.

13. The method of claim 11 wherein said series of disconnected short duration seasonal loads comprise both seasonal cooling loads and seasonal heating loads in an agribusiness environment.

14. A method of satisfying at least a portion of the postharvest crop cooling requirements at an agricultural produce processing facility where, during selected days of the harvest season, fresh produce is supplied to a cooling room for bringing the produce down to an appropriate holding temperature in a matter of several hours to extend shelf life and slow quality deterioration, said method comprising:

over a long term period measured in months, operating an ice machine on a substantially continuous basis and generating a sufficient quantity of ice to supply the cooling requirements for the postharvest crop cooling on the selected days plus an amount of ice to accommodate thermal energy storage losses;

storing the ice as generated in an ice/water mixture in a thermal energy storage tank;

transferring the thermal energy in the tank to satisfy said loads on demand;

the steps of operating the ice machine over a long term period and transferring the stored thermal energy to satisfy the loads on demand defining a charging/discharging time ratio greater than about 5;

whereby the electricity usage for powering said ice machine is decoupled from the energy demands of the postharvest crop cooling on the selected days of the harvest season to thereby shift electricity usage from a spiked, high power, direct acting basis occurring largely during peak demand periods to a long term level load at a low power level.

15. The method of claim 14 wherein the ice machine is operated at a charging/discharging time ratio greater than about 10.

16. The method of claim 14 wherein the ice machine is operated at a charging/discharging time ratio in the range from 15 to 30.

17. The method of claim 14 wherein the long term period measured in months is approximately one year.

18. The method of claim 14 including the steps of storing at least a portion of the heat rejected by the ice machine in a second thermal energy storage tank and transferring the thermal energy in the second tank to a series of disconnected short duration seasonal heating loads associated with the produce processing facility.

* * * * *